United States Patent
Chang

(10) Patent No.: US 8,441,455 B2
(45) Date of Patent: May 14, 2013

(54) TOUCH CONTROL DEVICE

(75) Inventor: Jen-Tsorng Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 998 days.

(21) Appl. No.: 12/488,549

(22) Filed: Jun. 20, 2009

(65) Prior Publication Data

US 2010/0026644 A1  Feb. 4, 2010

(30) Foreign Application Priority Data

Jul. 31, 2008 (CN) .......................... 2008 1 0303294

(51) Int. Cl.
*G06F 3/041* (2006.01)
*G06F 1/16* (2006.01)
*G02F 1/135* (2006.01)

(52) U.S. Cl.
USPC ............... 345/173; 361/679.01; 361/679.27; 349/65

(58) Field of Classification Search .......... 345/156–179; 361/679.02–679.61
See application file for complete search history.

(56) References Cited

U.S. PATENT DOCUMENTS

| 4,302,011 | A | * | 11/1981 | Pepper, Jr. .................... 463/37 |
| 4,844,465 | A | * | 7/1989 | Hibino et al. ............. 273/148 B |
| 5,186,646 | A | * | 2/1993 | Pederson ..................... 439/374 |
| 5,225,968 | A | * | 7/1993 | Ma ................................ 361/791 |
| 5,513,074 | A | * | 4/1996 | Ainsbury et al. ............ 361/737 |
| 6,020,878 | A | * | 2/2000 | Robinson ..................... 345/173 |
| 7,708,240 | B2 | * | 5/2010 | Homer et al. ................ 248/130 |
| 7,800,592 | B2 | * | 9/2010 | Kerr et al. ................... 345/173 |
| 2003/0006942 | A1 | * | 1/2003 | Searls et al. .................. 345/1.1 |
| 2003/0030971 | A1 | * | 2/2003 | Duarte ......................... 361/680 |
| 2004/0263484 | A1 | * | 12/2004 | Mantysalo et al. .......... 345/173 |
| 2005/0012723 | A1 | * | 1/2005 | Pallakoff ...................... 345/173 |

* cited by examiner

*Primary Examiner* — Bipin Shalwala
*Assistant Examiner* — Benyam Ketema
(74) *Attorney, Agent, or Firm* — Altis Law Group, Inc.

(57) ABSTRACT

An exemplary touch control device includes a main body, a touch panel configured for generating a signal based on a user's touch instruction, and a display unit configured for displaying an image in response to the signal. The touch panel is adjacent to the main body. Light of the displayed image is viewable by the user without the light passing through the touch panel.

15 Claims, 5 Drawing Sheets

TOUCH CONTROL DEVICE

BACKGROUND

1. Technical Field

The present disclosure generally relates to electronic control systems, and particularly to touch control devices.

2. Description of Related Art

With the rapid development of science and technology, portable electronic devices, such as notebook computers, personal digital assistants (PDAs), mobile phones, global positioning systems (GPSs) and multimedia players, are now widely used in many people's lives. A typical portable electronic device is equipped with a number of mechanical input keys, and a display for showing information (e.g., characters, pictures, etc.) thereon. The keys are used to input information/commands to the portable electronic device. However, with the ongoing trends of portable electronic devices becoming more and more multifunctional and miniaturized, the keys are commonly considered to take up a significant and unduly large amount of space.

Therefore, what is needed is a touch control device which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
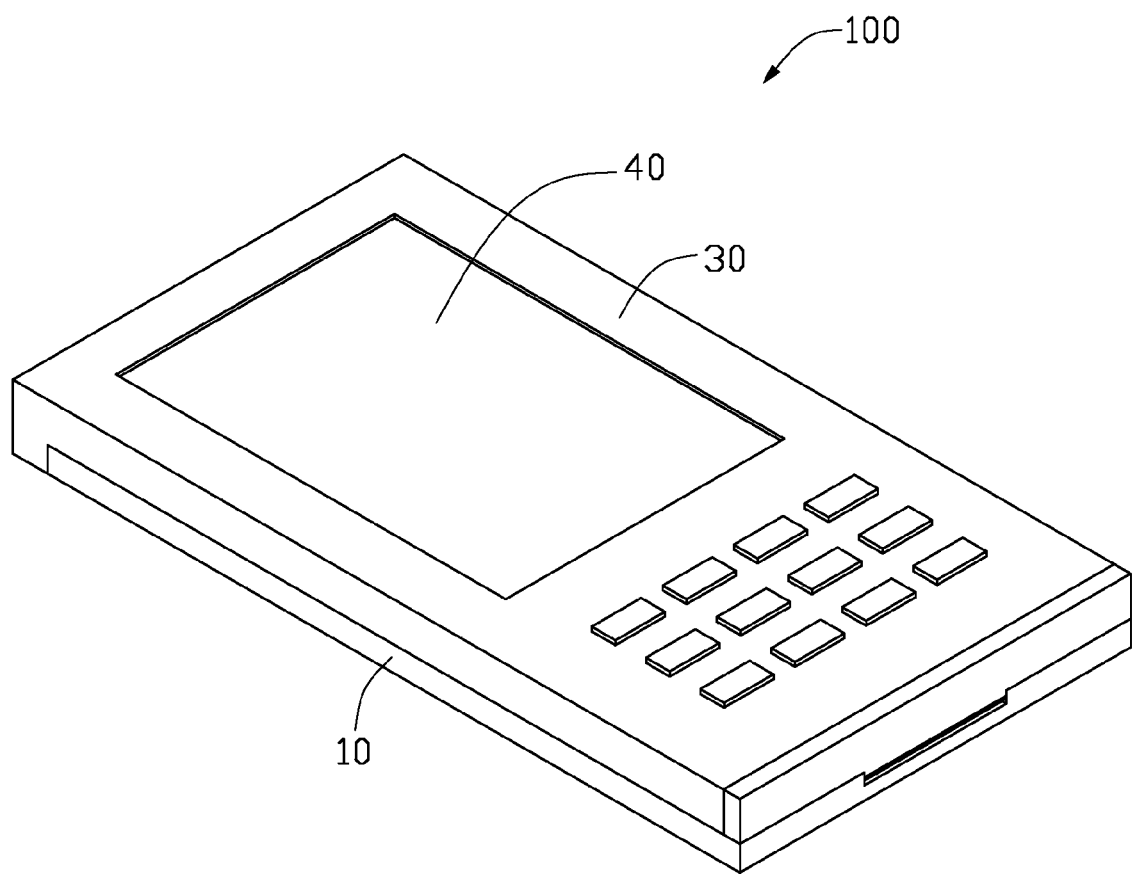
FIG. 1 is a schematic, isometric view of a touch control device according to an exemplary embodiment.
Figure 2:
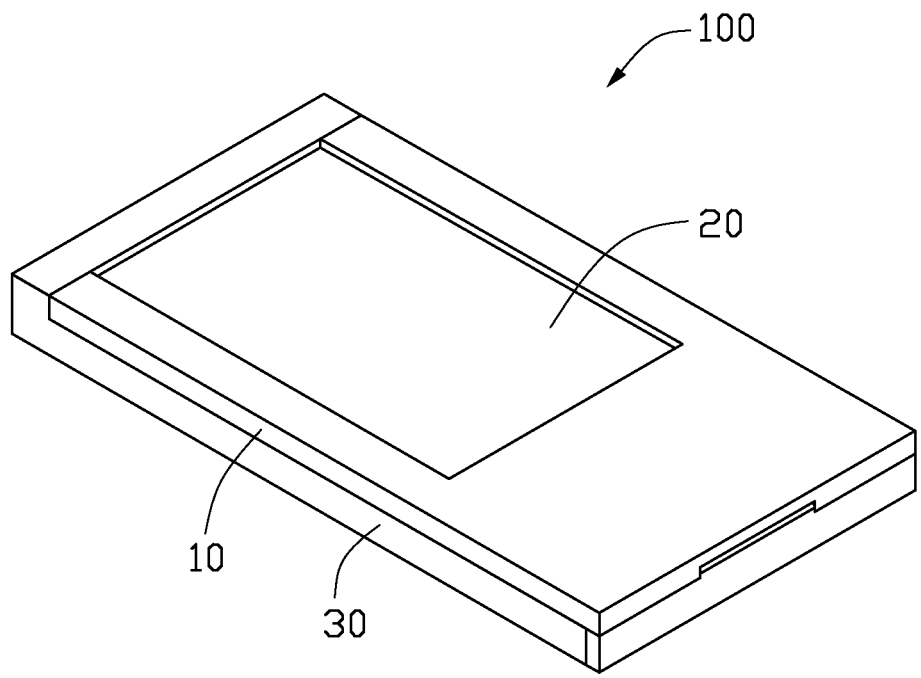
FIG. 2 is similar to FIG. 1, but showing the touch control device inverted.
Figure 3:
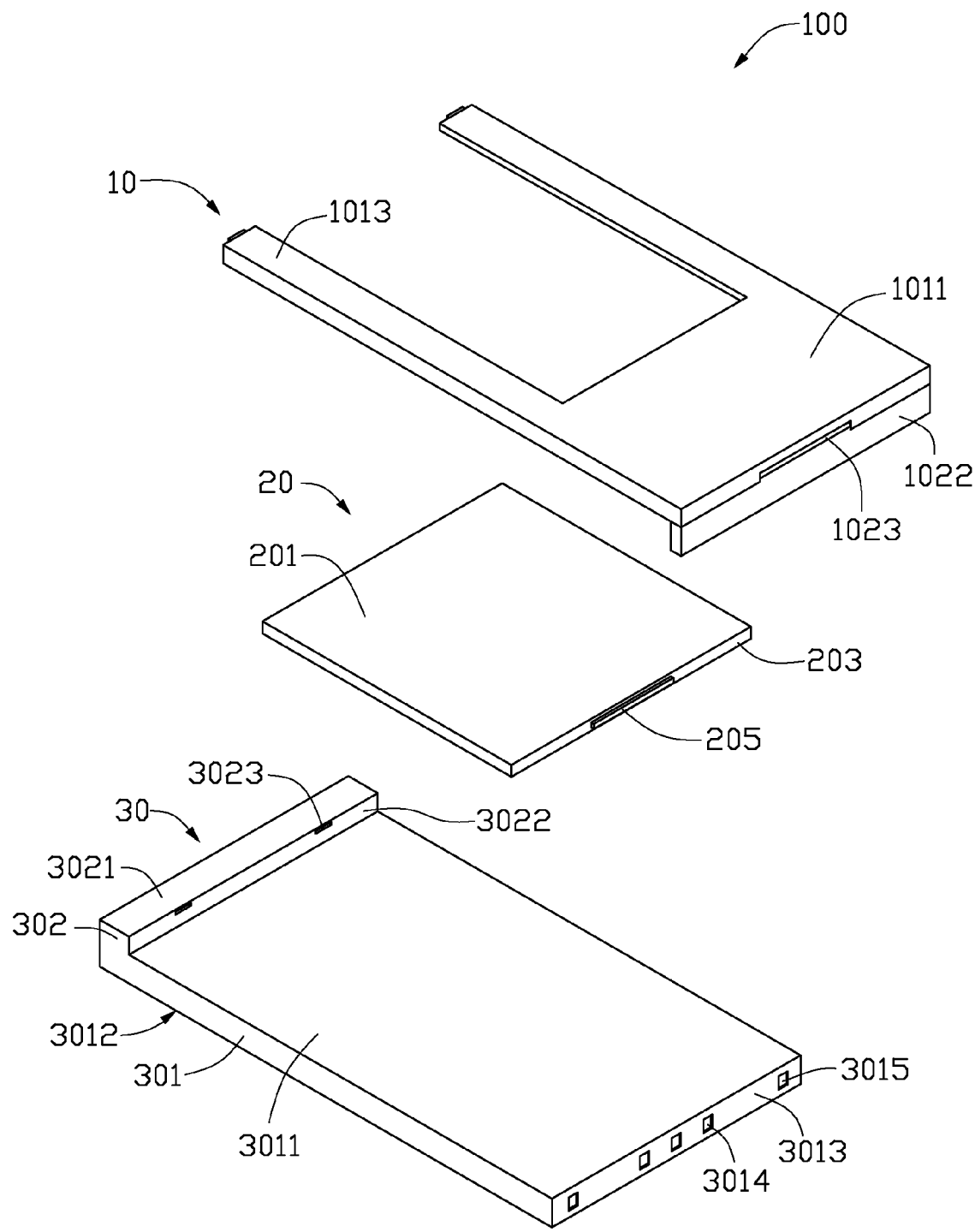
FIG. 3 is an exploded view of the touch control device shown in FIG. 2.

Referring to FIGS. 1-3, a touch control device 100, in accordance with an exemplary embodiment, is shown. The touch control device 100 includes a receiving seat 10, a touch panel 20 received in the receiving seat 10, a main body 30 coupled to the receiving seat 10 and adjacent to the touch panel 20, and a display unit 40 mounted on the main body 30. The touch panel 20 is configured for generating a signal based on a touch of a user, and inputting the signal to circuitry (not visible) of the touch control device 100. The display unit 40 is configured for emitting light and showing an image in response to the signal.

Figure 4:
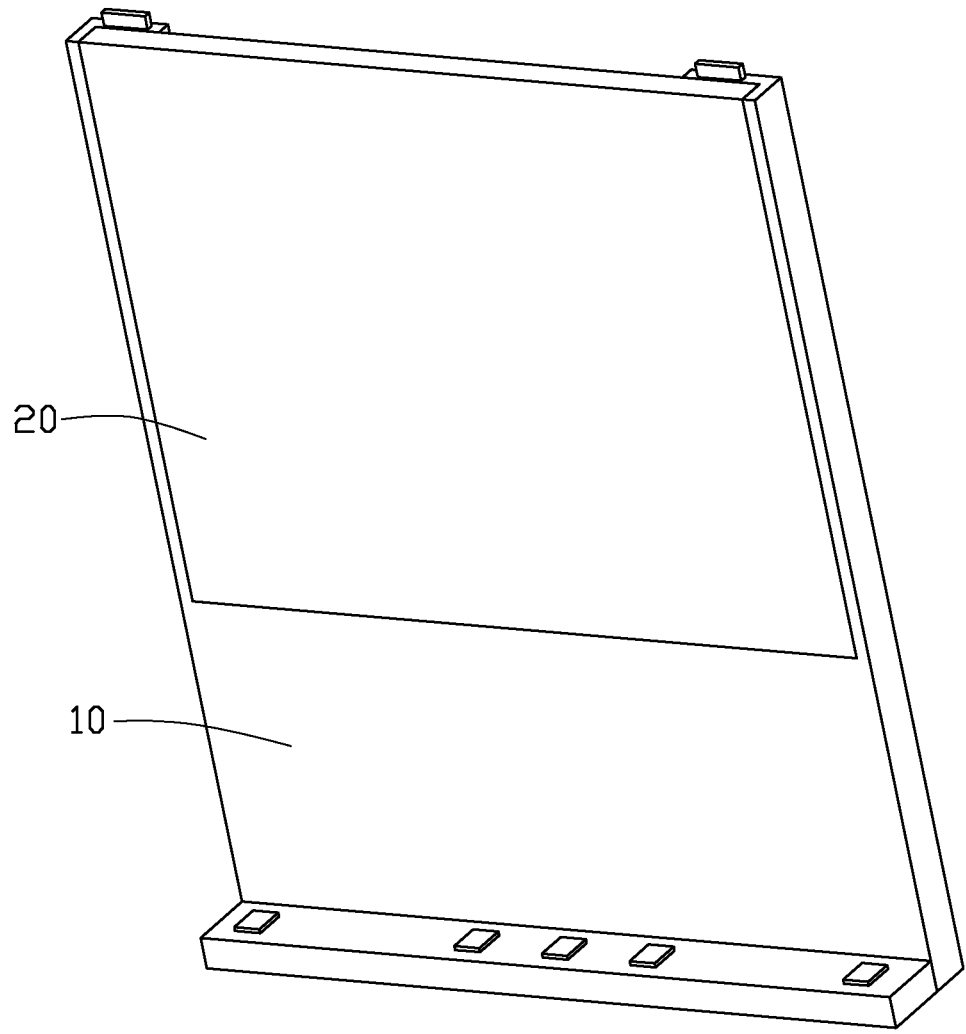
FIG. 4 is a schematic, isometric view of a receiving seat and a touch panel of the touch control device of FIG. 2, showing the touch panel coupled to the receiving seat.
Figure 5:
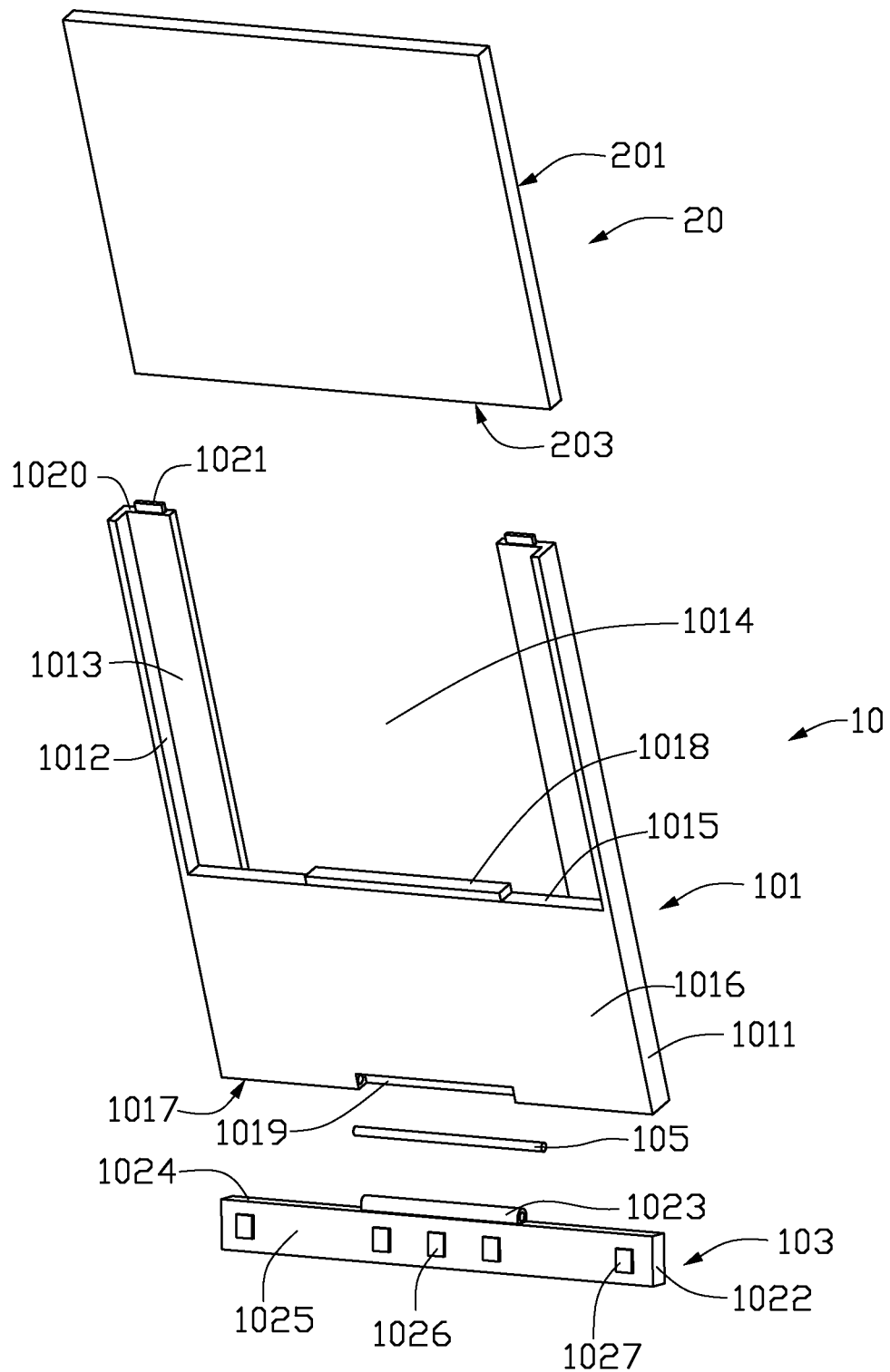
FIG. 5 is an exploded view of the receiving seat and the touch panel of FIG. 4.

Referring also to FIGS. 4 and 5, the receiving seat 10 includes a first part 101, a second part 103, and a pivot 105 interconnecting the first part 101 and second part 103.

The first part 101 includes a first flat plate 1011, a pair of first side plates 1012 parallel with each other, and a pair of holding plates 1013 coplanar with each other. The two first side plates 1012 extend longitudinally from right and left sides of the first flat plate 1011, respectively. The two holding plates 1013 extend inwardly toward each other from bottom sides of the first side plates 1012, respectively. The first flat plate 1011, the first side plates 1012, and the holding plates 1013 cooperatively define a receiving room 1014 for receiving the touch panel 20.

The first flat plate 1011 includes a first inner surface 1015, a first top surface 1016 perpendicular to the first inner surface 1015, a first outer surface 1017, a first electrical connecting member 1018 arranged at the first inner surface 1015, and a rectangular receiving slot 1019 defined in the first outer surface 1017. When the receiving seat 10 is coupled to the main body 30, the first top surface 1016 abuts the main body 30. The first electrical connector 1018 is configured for mechanically and electrically connecting the first flat plate 1011 with the touch panel 20. The rectangular receiving slot 1019 is configured for receiving the pivot 105 therein. In this embodiment, the first electrical connector 1018 protrudes out from the first inner surface 1015. In other embodiments, the first electrical connector 1018 can instead be arranged at one of the first side plates 1012 or one of the holding plates 1013. Furthermore, there can be two, three, or more first electrical connectors 1018 instead of only one.

Each holding plate 1013 includes an end surface 1020, and a first latching member 1021 arranged at the end surface 1020. The first latching member 1021 is configured for mechanically connecting the first part 101 with the main body 30. In this embodiment, the two first latching members 1021 of the first part 101 protrude outwardly from the two end surfaces 1020, respectively. In other embodiments, the two first latching members 1021 can instead be formed on the first top surface 1016 of the first flat plate 1011. Furthermore, there can be one, three, or more first latching members 1021 of the first part 101 instead of two.

The second part 103 is rotatably coupled to the first part 101 by the pivot 105. The second part 103 includes a second flat plate 1022, and a hollow receiving cylinder 1023 arranged at the second flat plate 1022. The second flat plate 1022 includes a second side surface 1024 having the hollow receiving cylinder 1023 arranged thereon, a second top surface 1025 perpendicular to the second side surface 1024, a plurality of second electrical connectors 1026 arranged at the second top surface 1025, and a plurality of second latching members 1027 formed on the second top surface 1025. The hollow receiving cylinder 1023 is configured for receiving the pivot 105 therein, and is received in the rectangular receiving slot 1019 to connect the second part 103 with the first part 101. When the receiving seat 10 is coupled to the main body 30, the second top surface 1025 abuts the main body 30. The second electrical connectors 1026 are electrically connected with the first electrical connector 1018 via wires (not shown). The second latching members 1027 are configured for mechanically connecting the second flat plate 1022 with the main body 30. In this embodiment, the second latching members 1027 protrude outwardly from the second top surface 1025.

The touch panel 20 includes a touch surface 201 for being touched by the user, a connecting surface 203 perpendicular to the touch surface 201, and a fourth electrical connector 205 (see FIG. 3) arranged at the connecting surface 203. When the touch panel 20 is received in the receiving room 1014, the touch surface 201 is adjacent to the holding plates 1013, and the connecting surface 203 abuts the first inner surface 1015. The fourth electrical connector 205 is configured for being mechanically and electrically coupled to the first electrical connector 1018, to mechanically and electrically connect the touch panel 20 with the first flat plate 1011. In this embodiment, the first electrical connector 1018 is generally in the form of a male connector, and the fourth electrical connector 205 is generally in the form of a mating female connector. Accordingly, the fourth electrical connector 205 receives the first electrical connector 1018 therein to connect the touch panel 20 with the first flat plate 1011.

Referring to FIG. 3 again, the main body 30 includes a third flat plate 301 and a fourth side plate 302 perpendicular to the third flat plate 301. The fourth side plate 302 extends perpendicularly from a left side of the third flat plate 301, as viewed in FIG. 3. In this embodiment, the fourth side plate 302 is integrally formed with the third flat plate 301.

The third flat plate 301 includes a third bottom surface 3011, a third top surface 3012 having the display unit 40 thereon, a third side surface 3013 perpendicular to the third bottom surface 3011, a plurality of third electrical connectors 3014 arranged at the third side surface 3013, and two third latching grooves 3015 formed in the third side surface 3013. When the receiving seat 10 is coupled to the main body 30, an end portion of the third bottom surface 3011 abuts the first top surface 1016 of the first flat plate 1011, and the third side surface 3013 abuts the second top surface 1025. The third electrical connector 3014 is configured for being coupled to the second electrical connector 1026, to electrically connect the main body 30 with the second part 103. In this embodiment, the third electrical connectors 3014 are generally in the form of female connectors, and the second electrical connectors 1026 are generally in the form of mating male connectors. The third latching grooves 3015 are configured for being coupled to the second latching members 1027 to mechanically connect the second part 103 with the main body 30. In this embodiment, the third latching grooves 3015 receive the second latching members 1027 therein, to mechanically connect the second part 103 with the main body 30. In other embodiments, the third electrical connector 3014 can instead be arranged at the third bottom surface 3011 of the third flat plate 301, or at the fourth side plate 302, etc.

In the present embodiment, the fourth side plate 302 includes a fourth bottom surface 3021 parallel with the third bottom surface 3011 of the third flat plate 301, a fourth side surface 3022 perpendicular to the fourth bottom surface 3021, and two fourth latching grooves 3023 formed in the fourth side surface 3022. The fourth side surface 3022 is disposed between and interconnects the third and fourth bottom surfaces 3011, 3021. The fourth latching grooves 3023 are configured for being coupled to the first latching members 1021, to mechanically connect the first part 101 with the main body 30. When such connection is made, the end surfaces 1020 abut the fourth side surface 3022. Accordingly, the fourth latching grooves 3023 receive the first latching members 1021 therein, respectively, to mechanically connect the first part 101 with the main body 30.

In a process of assembly of the touch control device 100, first of all, the pivot 105 is inserted in the hollow receiving cylinder 1023. Then, the hollow receiving cylinder 1023 is received in the rectangular receiving slot 1019. Next, the touch panel 20 is inserted in the receiving room 1014, and the fourth electrical connector 205 is mechanically and electrically connected with the first electrical connector 1018. Next, the first latching members 1021 are inserted into the fourth latching grooves 3023, respectively. Then, the second electrical connectors 1026 are electrically connected with the third electrical connectors 3014, respectively. Finally, the second latching members 1027 are respectively inserted into the third latching grooves 3015 to form the touch control 100.

The touch surface 201 and the display unit 40 are on two different sides of the main body 30. Hence, in operation, the touch panel 20 is not between the display unit 40 and the line of sight for the user viewing the display unit 40. Accordingly, the light of an image shown on the display unit 40 transmits to a user's eyes without passing through the touch panel 20.

Because the touch surface 201 and the display unit 40 are on two different sides of the main body 30, the display unit 40 is not prone to be contaminated or damaged when the user touches the touch surface 201 with his/her finger or a stylus or other similar instrument. In addition, because the touch panel 20 can be easily detached from or attached to the receiving seat 10, and because the receiving seat 10 can be easily detached from or attached to the main body 30, disassembly and assembly processes of the touch control device 100 are simple. Such structure provides easy access to the touch panel 20 when the touch panel 20 is broken or damaged and needs to be repaired or replaced.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A touch control device comprising:
   a main body;
   a touch panel configured for generating a signal based on a user's touch instruction, the touch panel being adjacent to the main body; and
   a display unit configured for displaying an image in response to the signal;
   a receiving seat coupled to the main body, the receiving seat comprising a first part, the first part comprising a first flat plate, a pair of first side plates parallel with each other, a pair of holding plates coplanar with each other, and a first electrical connector, the first side plates extending longitudinally from opposite sides of the first flat plate, respectively, the holding plates extending inwardly toward each other from bottom sides of the first side plates, respectively, a receiving room being cooperatively defined by the first flat plate, the first side plates, and the holding plates, the receiving room being configured for receiving the touch pane, the first flat plate comprising a first inner surface having the first electrical connector arranged thereat, the first electrical connector being configured for electrically connecting the first part with the touch panel; and
   wherein light of the displayed image is viewable by the user without the light passing through the touch panel.

2. The touch control device of claim 1, wherein the receiving seat further comprises a second part and a pivot connecting the first part with the second part, the first flat plate further comprises a first outer surface having a receiving slot defined therein, and the receiving slot receives the pivot.

3. The touch control device of claim 2, wherein the second part comprises a second flat plate, the second flat plate comprises a second side surface and a second top surface, the second side surface has a hollow receiving cylinder arranged thereon, the second top surface is perpendicular to the second side surface and has a second electrical connector arranged thereat, the hollow receiving cylinder receives the pivot, and is received in the rectangular receiving slot thereby connecting the second part with the first part, and the second electrical connector is configured for being electrically coupled to the main body.

4. The touch control device of claim 3, wherein each holding plate of the first part comprises an end surface and a first latching member formed at and protruding outwardly from the end surface, the main body further comprises a third flat plate, and a fourth side plate extending perpendicularly from a side of the third flat plate, the third flat plate comprises a third top surface, a third bottom surface having the display unit mounted thereat, and a third side surface perpendicular to the third top surface, the fourth side plate comprises a fourth side surface perpendicular to the third top surface of the third flat plate, and a plurality of fourth latching grooves formed in the fourth side surface, and the fourth latching grooves of the fourth side plate are configured for receiving the first latching members of the holding plates to mechanically connect the first part with the main body such that the end surfaces of the holding plates abut the fourth side surface of the fourth side plate and an end portion of the third flat plate abuts the first flat plate.

5. The touch control device of claim 4, wherein the third flat plate further comprises a plurality of third electrical connectors arranged at the third side surface, and the third electrical connectors are configured for being electrically coupled to the second electrical connectors to electrically connect the second part with the third flat plate.

6. The touch control device of claim 5, wherein the second flat plate further comprises a plurality of second latching members formed on the second top surface, the third flat plate further comprises a plurality of third latching grooves formed in the third side surface, and the third latching grooves of the third flat plate are configured for receiving the second latching members of the second flat plate to mechanically connect the third flat plate with the second flat plate such that the third side surface of the third flat abuts the second top surface of the second flat plate.

7. The touch control device of claim 1, wherein the touch panel further comprises a touch surface, a connecting surface perpendicular to the touch surface, and a fourth electrical connector arranged at the connecting surface, the fourth electrical connector is configured for being electrically coupled to the first electrical connector to mechanically and electrically connect the touch panel with the second part such that the connecting surface abuts the inner surface of the first flat plate and the touch surface is adjacent to the holding plates of the first part.

8. A touch control device comprising:
   a main body;
   a touch panel configured for generating a signal based on a user's touch instruction, the touch panel being adjacent to the main body;
   a receiving seat coupled to the main body, the receiving seat comprising a first part, the first part comprising a first flat plate, a pair of first side plates parallel with each other, a pair of holding plates coplanar with each other, and a first electrical connector, the first side plates extending longitudinally from opposite sides of the first flat plate, respectively, the holding plates extending inwardly toward each other from bottom sides of the first side plates, respectively, a receiving room being cooperatively defined by the first flat plate, the first side plates, and the holding plates, the receiving room being configured for receiving the touch pane, the first flat plate comprising a first inner surface having the first electrical connector arranged thereat, the first electrical connector being configured for electrically connecting the first part with the touch panel; and
   a display unit for displaying an image in response to the signal, wherein the touch panel is not between the display unit and the line of sight for the user viewing the display unit.

9. The touch control device of claim 8, wherein the receiving seat further comprises a second part and a pivot connecting the first part with the second part, the first flat plate further comprises a first outer surface having a receiving slot defined therein, and the receiving slot receives the pivot.

10. The touch control device of claim 9, wherein the second part comprises a second flat plate, the second flat plate comprises a second side surface and a second top surface, the second side surface has a hollow receiving cylinder arranged thereon, the second top surface is perpendicular to the second side surface and has a second electrical connector arranged thereat, the hollow receiving cylinder receives the pivot, and is received in the rectangular receiving slot thereby connecting the second part with the first part, and the second electrical connector is configured for being electrically coupled to the main body.

11. The touch control device of claim 10, wherein each holding plate of the first part comprises an end surface and a first latching member formed at and protruding outwardly from the end surface, the main body further comprises a third flat plate, and a fourth side plate extending perpendicularly from a side of the third flat plate, the third flat plate comprises a third top surface, a third bottom surface having the display unit mounted thereat, and a third side surface perpendicular to the third top surface, the fourth side plate comprises a fourth side surface perpendicular to the third top surface of the third flat plate, and a plurality of fourth latching grooves formed in the fourth side surface, and the fourth latching grooves of the fourth side plate are configured for receiving the first latching members of the holding plates to mechanically connect the first part with the main body such that the end surfaces of the holding plates abut the fourth side surface of the fourth side plate and an end portion of the third flat plate abuts the first flat plate.

12. The touch control device of claim 11, wherein the third flat plate further comprises a plurality of third electrical connectors arranged at the third side surface, and the third electrical connectors are configured for being electrically coupled to the second electrical connectors to electrically connect the second part with the third flat plate.

13. The touch control device of claim 12, wherein the second flat plate further comprises a plurality of second latching members formed on the second top surface, the third flat plate further comprises a plurality of third latching grooves formed in the third side surface, and the third latching grooves of the third flat plate are configured for receiving the second latching members of the second flat plate to mechanically connect the third flat plate with the second flat plate such that the third side surface of the third flat abuts the second top surface of the second flat plate.

14. The touch control device of claim 8, wherein the touch panel further comprises a touch surface, a connecting surface perpendicular to the touch surface, and a fourth electrical connector arranged at the connecting surface, the fourth electrical connector is configured for being electrically coupled to the first electrical connector to mechanically and electrically connect the touch panel with the second part such that the connecting surface abuts the inner surface of the first flat plate and the touch surface is adjacent to the holding plates of the first part.

15. A touch control device comprising:
   a main body;
   a receiving seat detachably mounted to the main body;
   a touch panel configured for generating a signal based on a user's touch instruction, the touch panel being detachably mounted to the receiving seat;
   mutually interconnectable electrical connectors at the touch panel and the receiving seat which are capable of mechanically and electrically connecting the touch panel to the receiving seat, mutually interconnectable latching member and latching groove at the receiving seat and the main body which are capable of mechanically connecting the receiving seat to the main body, and mutually interconnectable electrical connectors at the receiving seat and the main body which are capable of electrically connecting the receiving seat to the main body; and a display unit configured for displaying an image in response to the signal, the display unit being mounted to the main body;

wherein the touch panel and the display unit are located at opposite major sides of the touch control device.

* * * * *